US012617191B2

(12) United States Patent
Konduru et al.

(10) Patent No.: US 12,617,191 B2
(45) Date of Patent: May 5, 2026

(54) MULTILAYER POLYOLEFIN FILMS AND METHODS FOR THEIR PRODUCTION

(71) Applicant: Avery Dennison Corporation, Mentor, OH (US)

(72) Inventors: Venu M. Konduru, Aurora, OH (US); John E. Kovalchuk, Painesville, OH (US); Meng Li, Broadview Heights, OH (US); Hoang T. Pham, Painesville, OH (US); Jihui Shang, Mentor, OH (US)

(73) Assignee: Avery Dennison Corporation, Mentor, OH (US)

( * ) Notice: Subject to any disclaimer, the term of this patent is extended or adjusted under 35 U.S.C. 154(b) by 218 days.

(21) Appl. No.: 18/548,445

(22) PCT Filed: Feb. 28, 2022

(86) PCT No.: PCT/US2022/018081
§ 371 (c)(1),
(2) Date: Aug. 30, 2023

(87) PCT Pub. No.: WO2022/187118
PCT Pub. Date: Sep. 9, 2022

(65) Prior Publication Data
US 2024/0149573 A1 May 9, 2024

Related U.S. Application Data

(60) Provisional application No. 63/157,221, filed on Mar. 5, 2021.

(51) Int. Cl.
B32B 27/08 (2006.01)
B32B 27/20 (2006.01)
B32B 27/32 (2006.01)

(52) U.S. Cl.
CPC .............. *B32B 27/08* (2013.01); *B32B 27/20* (2013.01); *B32B 27/32* (2013.01);
(Continued)

(58) Field of Classification Search
None
See application file for complete search history.

(56) References Cited

U.S. PATENT DOCUMENTS 6,939,602 B2 9/2005 McGee et al.
7,217,463 B2 5/2007 Henderson
(Continued)

FOREIGN PATENT DOCUMENTS

CA 2492791 1/2004
CN 105034502 11/2015
(Continued)

OTHER PUBLICATIONS

International Search Report and Written Opinion dated May 13, 2022 issued in corresponding IA No. PCT/US2022/018081 filed Feb. 28, 2022.
(Continued)

*Primary Examiner* — Ramsey Zacharia

(57) ABSTRACT

Multilayer films comprising polyolefins and products comprising the multilayer films are disclosed. These multilayer films have fewer defects, especially optical defects.

5 Claims, 1 Drawing Sheet

(52) U.S. Cl.
CPC ..... *B32B 2250/05* (2013.01); *B32B 2250/246*
(2013.01); *B32B 2250/40* (2013.01); *B32B*
*2264/1022* (2020.08); *B32B 2270/00*
(2013.01); *B32B 2272/00* (2013.01)

(56) References Cited

U.S. PATENT DOCUMENTS

| | | | |
|---|---|---|---|
| 2002/0146520 A1 | 10/2002 | Squier et al. | |
| 2002/0182400 A1 | 12/2002 | Lu et al. | |
| 2004/0126514 A1 | 7/2004 | McGee et al. | |
| 2008/0233413 A1 | 9/2008 | Hostetter et al. | |
| 2014/0205847 A1* | 7/2014 | Falla ...................... | B32B 27/34 |
| | | | 264/510 |
| 2015/0259487 A1 | 9/2015 | Denis et al. | |
| 2016/0318288 A1 | 11/2016 | Pham et al. | |

FOREIGN PATENT DOCUMENTS

| | | |
|---|---|---|
| CN | 107635766 | 1/2018 |
| EP | 0950511 | 10/1999 |
| EP | 2043860 | 4/2009 |
| WO | 02/081207 | 10/2002 |
| WO | 2016/178965 | 11/2016 |
| WO | 2021/011576 | 1/2021 |

OTHER PUBLICATIONS

International Preliminary Report on Patentability dated Aug. 29, 2023 issued in corresponding IA No. PCT/US2022/018081 filed Feb. 28, 2022.

* cited by examiner

MULTILAYER POLYOLEFIN FILMS AND METHODS FOR THEIR PRODUCTION

CROSS REFERENCE TO RELATED APPLICATIONS

This application is a 371 of International Application No. PCT/US2022/018081, which was published in English on Sep. 9, 2022, and claims priority to U.S. Application No. 63/157,221 filed Mar. 5, 2021, the entire contents of which are herein incorporated by reference in their entireties.

FIELD OF THE INVENTION

The present invention generally relates to multilayer films and, more particularly, to multilayer films comprising polyolefins and products comprising the multilayer films.

BACKGROUND OF THE INVENTION

Multilayer films comprising polyolefins and products comprising the multilayer films are used in labels that provide information and/or decoration when printed. Defects in the multilayer film can cause issues with the ability to properly perceive the information or decoration on the substrate, such as a container, to which the label is applied. It is also important for proper branding and can be representative of quality of the contents of the container. Thus, it is desirable that the label not have any defects. The multilayer films and products comprising the multilayer films of the present invention are directed toward these, as well as other, important ends.

SUMMARY OF THE INVENTION

The invention relates generally to multilayer films comprising polyolefins and products comprising the multilayer films, especially those that have fewer visual defects.

In one aspect, the invention is directed to multilayer films, comprising:
 a core layer having a first side and second side;
 a first skin layer on the first side of the core layer;
 a second skin layer on the second side of the core layer;
 a first tie coat between the core layer and the first skin layer; and
 a second tie coat between the core layer and the second skin layer;
 wherein the first tie layer and the second tie layer each comprise at least 95% by weight, based on the weight of the tie layer, polypropylene and substantially no white pigment; and
 wherein the multilayer film is cavitated.

In another aspect, the invention is directed to a core layer having a first side and second side;
 a first skin layer on the first side of the core layer;
 a second skin layer on the second side of the core layer;
 a first tie coat between the core layer and the first skin layer; and
 a second tie coat between the core layer and the second skin layer;
 wherein the first tie layer and the second tie layer;
 wherein the multilayer film is oriented in a machine direction; and
 wherein the multilayer film is cavitated;
 wherein the first tie layer and the second tie layer each comprise:

about 60% by weight to about 100% by weight, based on the total weight of the skin layer, polypropylene;
 about 0.1% by weight to about 10% by weight, based on the total weight of the skin layer, ethylene vinyl acetate;
 about 0.1% by weight to about 20% by weight, based on the total weight of the skin layer, filler; and
 about 0.1% by weight to about 5% by weight, based on the total weight of the skin layer, filler.

In yet other aspects, the invention is directed to products, comprising:
 the multilayer film described herein; and
 an adhesive layer on at least a portion of the second skin layer on a side opposite to the core layer; and
 an optional release liner on the adhesive layer.

The summary of the invention is provided as a general introduction to some of the embodiments of the invention, and is not intended to be limiting. Additional example embodiments, including variations and alternative configurations, of the invention are provided herein.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. As will be realized, the subject matter described herein is capable of other and different embodiments and its several details are capable of modifications in various respects, all without departing from the claimed subject matter. Accordingly, the drawings and description are to be regarded as illustrative and not restrictive. In the drawings:

DETAILED DESCRIPTION OF THE ILLUSTRATED EMBODIMENTS

Definitions

Figure 1:
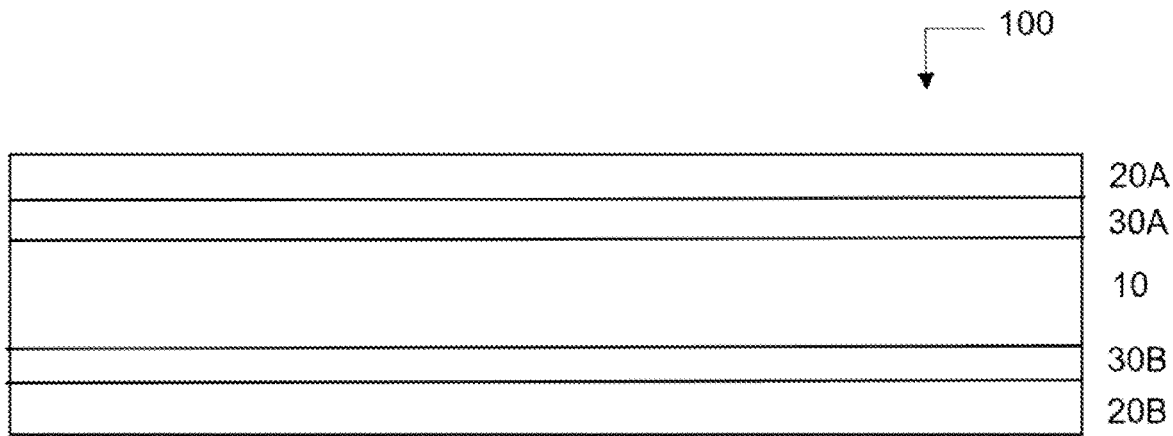
FIG. 1 illustrates one embodiment of the multilayer films of the invention.

As employed above and throughout the disclosure, the following terms, unless otherwise indicated, shall be understood to have the following meanings.

As used herein, the terms "comprises," "comprising," "includes," "including," "has," "having" or any other variation thereof, are intended are open-ended and cover a non-exclusive inclusion. For example, a process, method, article, or apparatus that comprises a list of elements is not necessarily limited to only those elements but may include other elements not expressly listed or inherent to such process, method, article, or apparatus. Also, use of "a" or "an" is employed to describe elements and components described herein. This is done merely for convenience and to give a general sense of the scope of the invention. This description should be read to include "one" or "at least one" and the singular also includes the plural, unless it is obvious that it is meant otherwise by the context. As used herein, the term "about," when referring to a measurable value such as an amount, a temporal duration, and the like, is meant to encompass variations of ±10%, preferably, ±8%, more preferably, ±5%, even more preferably, ±1%, and yet even more preferably, ±0.1% from the specified value, as such variations are appropriate to perform the disclosed methods.

As used herein, "pressure sensitive adhesive" or "PSA" refers to a material that may be identified by the Dahlquist criterion, which defines a pressure sensitive adhesive as an adhesive having a one second creep compliance of greater than $1 \times 10^{-6}$ cm²/dyne as described in *Handbook of PSA Technology*, Donatas Satas (Ed.), $2^{nd}$ Edition, page 172, Van Nostrand Reinhold, New York, N.Y., 1989. Since modulus is, to a first approximation, the inverse of creep compliance, pressure sensitive adhesives may also be defined as adhesives having a Young's modulus of less than $1 \times 10^6$ dynes/cm². Another well-known means of identifying a pressure sensitive adhesive is an adhesive that it is aggressively and permanently tacky at room temperature and firmly adheres to a variety of dissimilar surfaces upon mere contact without the need of more than finger or hand pressure, and which may be removed from smooth surfaces without leaving a residue, as described in Glossary of Terms Used in the Pressure Sensitive Tape Industry provided by the Pressure Sensitive Tape Council, 1996. Another suitable definition of a suitable pressure sensitive adhesive is that it preferably has a room temperature storage modulus within the area defined by the following points as plotted on a graph of modulus versus frequency at 25° C.: a range of moduli from about $2 \times 10^5$ to $4 \times 10^5$ dynes/cm² at a frequency of about 0.1 radians/sec (0.017 Hz), and a range of moduli from about $2 \times 10^6$ to $8 \times 10^6$ dynes/cm² at a frequency of approximately 100 radians/sec (17 Hz). See, for example, *Handbook of PSA Technology* (Donatas Satas, Ed.), $2^{nd}$ Edition, page 173, Van Nostrand Rheinhold, N.Y., 1989. Any of these methods of identifying a pressure sensitive adhesive may be used to identify suitable pressure sensitive adhesives for use in the labels of the invention. Pressure sensitive adhesives are permanently tacky in dry form and can firmly adhere to a substrate with very light pressure. The adhesive requires no activation by solvent, water, or heat to exert sufficient holding power.

As used herein, "filler" refers to particles or fibers added to polymeric compositions to improve properties (such as tensile strength, toughness, heat resistance, color, and clarity), provide a cost advantage, or a combination thereof. Typical fillers include, but are not limited to, calcium carbonate (ground or precipitated), kaolin, talc, carbon black, and the like.

As used herein, "white pigment" refers to inorganic or synthetic substance that imparts whiteness or opacity, especially a powdered substance that is mixed with a liquid in which it is relatively insoluble and used especially to impart color to coating materials (such as paints) or to polymers, inks, plastics, and rubber. Typical white pigments include titanium dioxide, aluminum silicate, antimony (III) oxide, barium sulfate, zinc sulfide, lithopone, alumina hydrate, calcium carbonate, blanc fixe, barytes, talc, silica, China clay, hollow sphere pigments sold under the ROPAQUE brand, and the like.

As used herein, "non-post-consumer recycled" refers to the use (or re-use) of a material by re-introducing of manufacturing scrap (trimmings, defective materials or products, and the like) back into the manufacturing process (and not from the end-user), such as, for example, by repelletizing the material.

As used herein, the phrase "printed indicia" means any string of alphanumeric or special characters used to convey information and/or provide aesthetic appeal. The indicia may be printed in any suitable means including printing by hand, typewriter, or convention printing (such as flexographic printing, offset printing, inkjet printing, gravure printing, and the like).

Multilayer Films

In one aspect, the invention is directed to multilayer films, comprising:

a core layer having a first side and second side;
a first skin layer on the first side of the core layer;
a second skin layer on the second side of the core layer;
a first tie coat between the core layer and the first skin layer; and
a second tie coat between the core layer and the second skin layer;
wherein the first tie layer and the second tie layer each comprise at least 95% by weight, based on the weight of the tie layer, polypropylene and substantially no white pigment; and
wherein the multilayer film is cavitated.

In another aspect, the invention is directed to multilayer films, comprising:

a core layer having a first side and second side;
a first skin layer on the first side of the core layer;
a second skin layer on the second side of the core layer;
a first tie coat between the core layer and the first skin layer; and
a second tie coat between the core layer and the second skin layer;
wherein the first tie layer and the second tie layer;
wherein the multilayer film is oriented in a machine direction; and
wherein the multilayer film is cavitated;
wherein the first tie layer and the second tie layer each comprise:
about 60% by weight to about 100% by weight, based on the total weight of the skin layer, polypropylene;
about 0.1% by weight to about 10% by weight, based on the total weight of the skin layer, ethylene vinyl acetate;
about 0.1% by weight to about 20% by weight, based on the total weight of the skin layer, filler; and
about 0.1% by weight to about 5% by weight, based on the total weight of the skin layer, filler.

An example of the multilayer film construction is shown in FIG. 1, where multilayer film 100 includes five layers: core layer 10, two skin layers (20A is the first skin or print skin layer on the first side of the core layer; 20B is the second skin or adhesive skin layer on the second side of the core layer), and two tie layers (30A is the first tie layer on the first side of the core layer; 30B is the second tie layer on the second side of the core layer). Printed indicia (not shown) may be applied to the first skin or print skin layer.

In certain embodiments of the multilayer film, the opacity of the film is at least 70%, preferably at least 75%, and more preferably 77%, as measured in accordance with TAPPI T-425 test method. Because of the preferred opacity levels, the film has high opacity as a light blocking layer.

In certain embodiments of the multilayer film, wherein the density of the film is no more than 0.94 g/cm³, preferably no more than 0.93 g/cm3, as measured in accordance with test method described in the Examples. Because of the preferred density levels, the film is light enough to float in a water solution separation process.

In certain embodiments, the core layer comprises:
polypropylene;
at least one filler; and
at least one white pigment.

In certain embodiments, the first skin layer and the second skin layer each comprise:
polypropylene;
ethylene vinyl acetate; and
optional processing aid.

In certain embodiments, the multilayer film is oriented in a machine direction.

In certain embodiments, the filler is calcium carbonate.

In certain embodiments, the white pigment is titanium dioxide.

In certain embodiments, the core layer is present at a level of about 60% by weight to about 80% by weight, based on the total weight of the multilayer film.

In certain embodiments, the first skin layer and second skin layer are each present at a level of about 5% by volume to about 10% by volume, based on the total volume of the multilayer film. In certain other embodiments, the first tie layer and second tie layer are each present at a level of about 6% by volume to about 8% by volume, based on the total volume of the multilayer film.

In certain embodiments, the core layer is present at a level of about 65% by volume to about 75% by volume, based on the total volume of the multilayer film;

the first skin layer and second skin layer are each present at a level of about 7% by volume to about 8% by volume, based on the total volume of the multilayer film; and the first tie layer and second tie layer are each present at a level of about 7% by volume to about 8% by volume, based on the total volume of the multilayer film.

In certain embodiments, the core layer comprises:

about 60% by weight to about 80% by weight, based on the total weight of the core layer, polypropylene;

about 20% by weight to about 30% by weight, based on the total weight of the core layer, calcium carbonate; and about 2% by weight to about 5% by weight, based on the total weight of the core layer, titanium dioxide.

In certain embodiments, the first skin layer and the second skin layer each comprise:

about 40% by weight to about 60% by weight, based on the total weight of the skin layer, polypropylene;

about 40% by weight to about 60% by weight, based on the total weight of the skin layer, ethylene vinyl acetate; and a processing aid.

In certain embodiments, the first tie layer and the second tie layer each comprise non-post-consumer waste recycled content. In certain embodiments, the first tie layer and the second tie layer each comprise up to about 50% by weight, preferably up to about 100% by weight, based on the total weight of the respective tie layer, non-post-consumer waste recycled content.

In certain embodiments, the core layer comprises non-post-consumer waste recycled content. In certain embodiments, the core layer comprises up to about 50% by weight, based on the total weight of the core layer, non-postconsumer waste recycled content.

In certain embodiments, the multilayer films described herein, further comprising:

printed indicia on at least a portion of the first skin.

In yet other aspects, the invention is directed to products, comprising:

the multilayer film described herein; and an adhesive layer on at least a portion of the second skin layer on a side opposite to the core layer; and an optional release liner on the adhesive layer.

In certain embodiments, the adhesive layer comprises a pressure sensitive adhesive.

Figure 2:
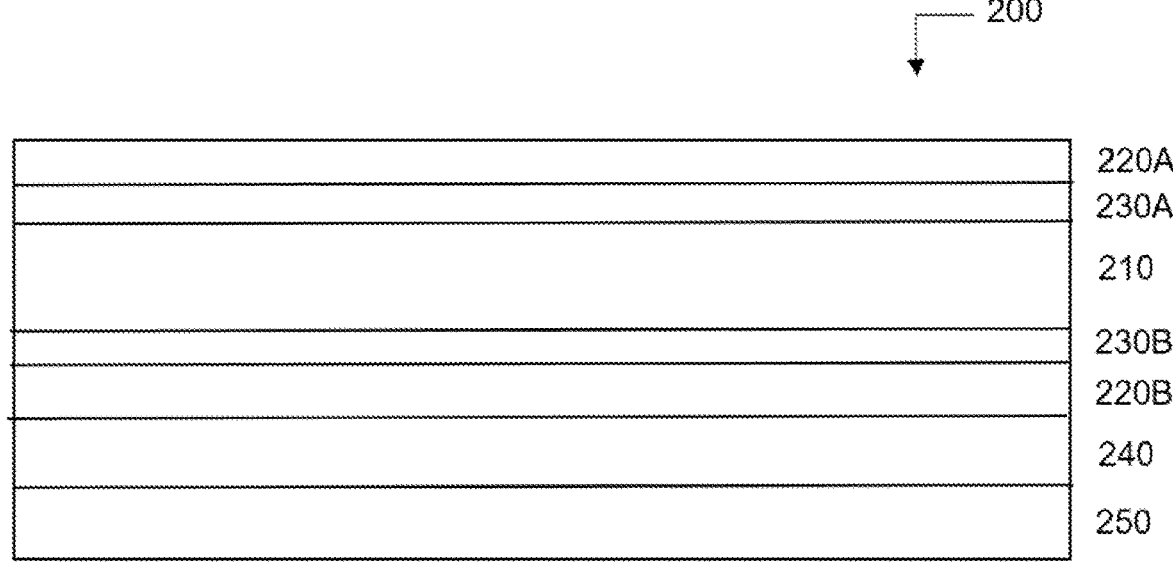
FIG. 2 illustrates one embodiment of the products comprising a multilayer film of the invention.

An example of the product comprising one multilayer film construction is shown in FIG. 2, where product 200 includes five layers: core layer 210, two skin layers (220A is the first skin or print skin layer on the first side of the core layer; 220B is the second skin or adhesive skin layer on the second side of the core layer), and two tie layers (230A is the first tie layer on the first side of the core layer; 230B is the second tie layer on the second side of the core layer), adhesive layer 240, and optional release layer 250. Printed indicia (not shown) may be applied to the first skin or print skin layer.

Methods of Preparing the Multilayer Films

The layers of the multilayer film of the present invention can be prepared by steps comprising extrusion of a layer from a linear or annular die, by coextrusion of two or more layers from a linear or annular die, by lamination of two or more previously formed layers, or any combination of the foregoing steps. In an embodiment of the invention the film is prepared by coextrusion from a linear die.

In one embodiment the multilayer film may subsequently be oriented by stretching it biaxially in the machine direction (direction the film is advanced during film manufacture) and transverse direction (direction normal or perpendicular to the machine direction) or uniaxially in the machine direction. In an embodiment of the invention, the film is oriented in the machine direction only by stretching it from about 2 to 9 times, 3 to 9 times, or 4 to 6 times. The oriented film can also be heat set or annealed to provide dimensional stability to the film to prevent or minimize shrinking or distortion. Coextrusion, orientation and annealing procedures that can be used to manufacture a film are described in U.S. Pat. No. 7,217,463. The film can also be treated on the surface of the first skin layer 20A (print skin layer), the second skin layer 20B (adhesive skin layer), or the surfaces of both the first skin layer 20A and the second skin layer 20B to further improve adhesion of an ink or an adhesive to a skin layer. Surface treatments can comprise corona discharge treatment, flame treatment, plasma treatment, coating with an ink- or adhesive-receptive material such as an acrylic coating, or a combination of any of the foregoing treatments. In embodiments of the invention the film is corona treated on one or both skin surfaces, or the film is flame treated on one or both skin surfaces.

Orienting a film in the machine direction only generally increases the tensile modulus or stiffness in the machine direction. This increased machine direction stiffness provides a label, prepared from the film, with proper dispensability and good print registration in the labeling of articles. This film, oriented in the machine direction only, generally has a substantially lower tensile modulus or stiffness in the transverse direction (TD) compared to the machine direction (MD) which provides a derivative label with good conformability to the surface of an article to be labeled. In embodiments of the invention the TD to MD tensile modulus ratio is less than 0.75, 0.65, or 0.6.

The film, following manufacture, which can comprise for example coextrusion or coextrusion and orientation, can have a total thickness ranging from 0.5-10 mils (12.7-254 micrometers), 1-7 mils (25.4-177.8 micrometers), or 1.5-4 mils (38.1-101.6 micrometers). The skin layers can be 1-20%, 2-15%, 2-8% of the thickness of the film. The core layer or the combined core layer and tie layer can be 60-98%, 70-96%, or 84-96% of the thickness of the film. The tie layer can be 0.1-0.5 times the thickness of the core layer.

Adhesive Layer

The products comprising the multilayer films may further comprise an adhesive layer. The adhesive layer may comprise a pressure sensitive adhesive and optional tackifier and other additives. The pressure sensitive adhesive useful in the adhesive layer of the multilayer film construction may be formed into a single layer or contain multiple layers of adhesive. The multiple layers of adhesive may be applied to the multilayer film construction simultaneously using methods known in the art. Examples of suitable adhesive coating methods include slot die coating, bullnose coating, reverse roll coating and the like.

The adhesive layer of the present invention may further comprise additives such as pigments, colors or colorants, fillers, plasticizer, diluents, antioxidants, UV absorbers, tackifiers, and the like, and combinations thereof.

Pigment, if desired, is provided in an amount sufficient to impart the desired color to the adhesive. Examples of pigments include, without limitation, solid inorganic fillers such as carbon black, titanium dioxide and the like, and organic dyes.

In addition to tackifiers, other additives may be included in the pressure sensitive adhesives to impart desired properties. For example, plasticizers may be included, and they are known to decrease the glass transition temperature of an adhesive composition containing elastomeric polymers. Antioxidants also may be included in the adhesive compositions. Cutting agents such as waxes and surfactants also may be included in the adhesives. Light stabilizers, heat stabilizers, and UV absorbers also may be included in the adhesive compositions. Ultraviolet absorbers include benzotriazol derivatives, hydroxy benzyl phenones, esters of benzoic acids, oxalic acid, diamides, and the like. Light stabilizers include hindered amine light stabilizers, and the heat stabilizers include dithiocarbamate compositions such as zinc dibutyl dithiocarbamate.

A wide variety of tackifiers can be used to enhance the tack and peel of the adhesive. These include rosins and rosin derivatives including rosinous materials that occur naturally in the oleoresin of pine trees, as well as derivatives thereof including rosin esters, modified rosins such as fractionated, hydrogenated, dehydrogenated, and polymerized rosins, modified rosin esters and the like.

There may also be employed terpene resins which are hydrocarbons of the formula $C_{10}H_{16}$, occurring in most essential oils and oleoresins of plants, and phenol modified terpene resins like α-pinene, β-pinene, dipentene, limonene, myrecene, bornylene, camphene, and the like. Various aliphatic hydrocarbon resins like Escorez 1304, manufactured by Exxon Chemical Co., and aromatic hydrocarbon resins based on $C_9$, $C_5$, dicyclopentadiene, coumarone, indene, styrene, substituted styrenes and styrene derivatives and the like can also be used.

Hydrogenated and partially hydrogenated resins such as Regalrez 1018, Regalrez 1033, Regalrez 1078, Regalrez 1094, Regalrez 1126, Regalrez 3102, Regalrez 6108, etc., produced by Eastman Chemical Company, can be used. Various terpene phenolic resins of the type SP 560 and SP 553, manufactured and sold by Schenectady Chemical Inc., Nirez 1100, manufactured and sold by Reichold Chemical Inc., and Piccolyte S-100, manufactured and sold by Hercules Corporation, are particularly useful tackifiers for the present invention. Various mixed aliphatic and aromatic resins, such as Hercotex AD 1100, manufactured and sold by Hercules Corporation, can be used.

While the resins described above are quite useful for tackifying the copolymers of the instant invention, the particular tackifying resin and/or amount selected for a given formulation may depend upon the type of acrylic polymer being tackified. Many resins which are known in the prior art as being useful for tackifying acrylic based pressure sensitive adhesives can be effectively used in the practice of the present invention, although the scope of the invention is not limited to only such resins. Resins described in Satas, *Handbook of Pressure Sensitive Adhesive Technology*, Von Nostrand Reinhold, Company, Chapter 20, pages 527-584 (1989) (incorporated by reference herein) could be used.

The amount of tackifier used in the present invention is dependent upon the type of copolymer and tackifier used. Typically, pressure-sensitive adhesive compositions prepared in accordance with the present invention will comprise from 5 to about 60% by weight total of one or more tackifiers.

In one embodiment, the tackifier has a ring and ball softening point of from about 100° C. to about 150° C. In one embodiment, the tackifier comprises a terpene phenolic tackifier having a ring and ball softening point of from about 110° C. to about 120° C.

In another embodiment, the added resin may serve a dual purpose. For example, a resin such as Wingstay L*, a butylated reaction product of para-cresol and dicyclopentadiene with an average molecular weight of 650 produced by Eliokem, can serve both as a tackifier and an antioxidant.

Release Layer

The products comprising the multilayer films and an adhesive layer can optionally include a release liner as desired, wherein the release liner or carrier may be coated with a layer of adhesive for application to the multilayer film structure. When the multilayer film is combined with the liner or carrier, the adhesive is joined to the multilayer film to create an adhesive article. Later, the liner or carrier is removed to expose the adhesive, which now remains permanently joined to a second side of the multilayer film structure. Alternatively, the adhesive may be coated directly on the multilayer film structure prior to combining the structure with a release liner or carrier web.

The release liner may be a single- or multi-layer film material that is applied to cover the adhesive layer, for protecting the adhesive layer from premature exposure to contaminants or from being adhered to a substrate before intended. The release liner can be removed from the multilayer film structure in order to expose the adhesive layer, whereby the adhesive layer can be placed in contact with a substrate and adhered thereto.

The release liner is not particularly limited and can include any material capable of being applied to and removed from the adhesive layer without degrading or damaging the adhesive layer, and without inhibiting bonding of the multilayer film structure to a substrate. The release liner can include one or more additives or coatings to enhance certain attributes of the release liner, such as silicone or polytetrafluoroethylene coatings to decrease bonding with the adhesive layer.

Typical liner materials are super calendered kraft paper, glassine, clay coated kraft paper, machine finished kraft paper, machine glazed paper, biaxially oriented polyethylene terephthalate film, polypropylene film, polyethylene film, biaxially oriented polypropylene film, polyester, acrylic, nylon, cellulosic derivative, butylene; isobutylene; high, medium, low, and linear low density polyethylene; ethylene vinyl acetate; ethylene acrylic acid; ethylene methyl (meth) acrylate; ethylene butyl acrylate; polypropylene; ethylene/propylene copolymers; and impact resistant ethylene/propylene copolymers and combinations thereof.

The multilayer film structures may also include an indicia layer (e.g. a printed layer) comprising one or more portions on the print side of the multilayer film structure.

The indicia can be applied by any appropriate coating or printing technique including digital printing, screen printing, spraying, dip coating, dusting, electrostatic coating, vapor deposition, curtain coating, bar coating, knife coating, or any other coating or printing means known in the art and combinations thereof.

The material used to form indicia layer, including Indicia, is not particularly limited by the present subject matter and can include for example, UV curable coatings, inks, paints, or the like which contain pigments, dyes, metal (e.g. metal flakes or metal pigments), or other coating or printing material known to be useful for labelstock, and combinations thereof. In one embodiment, the indicia layer comprises a metallized layer that may be produced by vacuum deposition or by other techniques.

Printed and die cut labels incorporating the multilayer film structures of the present subject matter, may be applied to various substrates, for example containers. The substrates may comprise rigid substrates such as glass bottles or other rigid articles tending to have irregularities or contours in the surface and therefore requiring labels that are flexible and that closely adhere (conform) to the surface without bridging local surface depressions. Alternatively, the substrates may be soft, flexible substrates such as plastic containers requiring labels that conform when the container is flexed. Combinations The present subject matter also includes a combination comprising a substrate defining a surface, and a product containing the multilayer film construction described herein. The substrate can comprise a container including a hollow body defining an interior for housing an associated material. The hollow body can be rigid or flexible. For example, the hollow body can be configured to dispense the material from the interior by squeezing the hollow body.

The present subject matter also includes a method of labeling a substrate including providing a substrate comprising a surface and providing a label. The label can be the multilayer film structure as described herein including a core layer, two skin layers, and an adhesive layer. The method includes contacting the adhesive layer to the surface of the substrate to thereby adhere the adhesive layer to the substrate.

The methods may include applying indicia to the label or labelstock comprising the multilayer film structure as described herein. Further, the methods may include utilizing a release liner and a tie layer as described herein.

The present invention is further defined in the following Examples, in which all parts and percentages are by weight, unless otherwise stated. It should be understood that these examples, while indicating preferred embodiments of the invention, are given by way of illustration only. From the above discussion and these examples, one skilled in the art can ascertain the essential characteristics of this invention, and without departing from the spirit and scope thereof, can make various changes and modifications of the invention to adapt it to various usages and conditions.

EXAMPLES

The following test methods were used to evaluate exemplary embodiments and comparative materials, unless otherwise noted. The standardized tests are noted directly in the data tables.

Tensile: Rectangular tensile specimens of 5-inch length× 1-inch width were cut from the film using a precise 1-inch die stamp. Specimen thickness was measured using the caliper measurements using an Emveco 200A Electronic microgage (per TAPPI Test Method TAPPI-411 (2021)), Tensile specimen was then placed on a MTS/Sintech Tensile Tester where: the grip-to-grip distance was 1 inch for cross direction (CD) test and 20 inch gap for the machine direction (MD) test. The tensile tests were conducted at a cross head speed of 5 inch/min. Tensile properties were then collected via the MTS/Sintech program. The data is reported as the average from the testing of five replicates.

Stiffness: The test method uses a modified version of the TAPPI T556 (2021) standard test method with a 15° bending in lieu of the 5° bending.

Density: The test method involves measuring the thickness, length, width, and weight of a single sheet of film to calculate density. Samples were cut to 4"×4" using die. The width of the sample in the machine direction (MD) and cross direction (CD) was measured using a steel ruler. The caliper of the sample was measured using an Emveco caliper and the average of nine repetitions was used. The weight of the sample was measured using a balance with units in grams. Density was then calculated using the following formula:

Film Weight (g)/Film Volume (length-in.×width-in.× caliper-in.×16.387 to convert to cm) Density is reported in g/cm$^3$.

Abbreviations Used in Examples

PP=polypropylene
EVA=ethylene vinyl acetate
VA=vinyl acetate
TiO$_2$=titanium dioxide
CaCO$_3$=calcium carbonate Multilayer films were prepared by coextrusion. The compositions and constructions are described in the tables below:

| Layer | Layer Thickness | Component | Weight of component in layer |
|---|---|---|---|
| A (Print - Skin) | 7.50% | Polypropylene | 49.75% |
| | | EVA - 18% VA | 49.75% |
| | | Process Aid Concentrates | 0.50% |
| B (Tie Layer) | 7.50% | Polypropylene | 70% |
| | | White Pigments Concentrates | 30% |
| | | (Equivalent to 85% PP and 15% Pigments | |
| C (Core + Baby Core) | 70% | Polypropylene | 61.40% |
| | | 80% Calcium Carbonate Concentrates | 30.60% |
| | | White Pigments Concentrates | 8% |
| | | (Equivalent to 71.52% PP, 24.48% CaCO$_3$ and 4% white pigment) | |

-continued

| Layer | Layer Thickness | Component | Weight of component in layer |
|---|---|---|---|
| B (Tie Layer) | 7.50% | Same as B above | |
| A (Adhesive-Skin) | 7.50% | Same as A above | |

| Layer | Layer Thickness | Component | Weight of component in layer |
|---|---|---|---|
| A (Print - skin) | 7.50% | Polypropylene | 49.75% |
| | | EVA - 18% VA | 49.75% |
| | | Process Aid Concentrates | 0.50% |
| B (Tie Layer) | 7.50% | Polypropylene | 100% |
| C (Core + Baby Core) | 70% | Polypropylene | 61.40% |
| | | 80% Calcium Carbonate Concentrates | 30.60% |
| | | White Pigments Concentrates | 8% |
| | | (Equivalent to 71.52% PP, 24.48% $CaCO_3$ and 4% white pigment) | |
| B (Tie Layer) | 7.50% | Same as B above | |
| A (Adhesive-Skin) | 7.50% | Same as A above | |

Example P'

| Layer | Layer Thickness | Component | Weight of component in layer |
|---|---|---|---|
| A (Print - skin) | 7.50% | Polypropylene | 49.75% |
| | | EVA - 18% VA | 49.75% |
| | | Process Aid Concentrates | 0.50% |
| B (Tie Layer) | 7.50% | Repelletized Scrap of Example P* | 100% |
| C (Core + Baby Core) | 70% | Polypropylene | 61.40% |
| | | 80% Calcium Carbonate Concentrates | 30.60% |
| | | White Pigments Concentrates | 8% |
| | | (Equivalent to 71.52% PP, 24.48% $CaCO_3$ and 4% white pigment) | |
| B (Tie) | 7.50% | Same as B above | |
| A (Adhesive-skin) | 7.50% | Same as A above | |

*Repelletized Scrap Composition (% by weight)

| | |
|---|---|
| Polypropylene | 65% |
| EVA - 18% VA | 6.50% |
| 80% Calcium Carbonate Concentrates | 22.70% |
| White Pigments Concentrates | 5.9% |
| Process Aid concentrates | 0.10% |

Notes:
Tie layer may contain from 100% PP to 100% repelletiized scrap ("repel").
The baby core layer may contain up to 50% repelletized scrap.

The comparative and inventive multilayer film were tested. The results are shown in the table below. The inventive multilayer film had no defects by visual inspection.

| Properties | Units | Test Method | Comparative | Example P |
|---|---|---|---|---|
| Caliper, MD | mils | TAPPI T-411 (2015) | 2.06 | 2.1 |
| Caliper, CD | mils | TAPPI T-411 (2015) | 2.06 | 2 |
| Film Yield | MSI/lb | | | 14.6 |
| Density | g/cm$^3$ | Described in Test Methods above | 0.91 | 0.87 |
| Brightness | | ASTM D1746 (2015) | 93.3 | 90.2 |
| Color, L | | ASTM D1746 (2015) | 96.9 | 95.2 |
| a | | ASTM D1746 (2015) | 0.06 | −0.04 |
| b | | ASTM D1746 (2015) | 0.73 | 0.6 |
| Opacity | % | TAPPI T-425 (2021) | 89 | 86 |
| Gloss 60 MD | | ASTM D2457 (2021) | 39 | 38 |
| Gloss 60 CD | | ASTM D2457 (2021) | 12 | 11 |

-continued

| Properties | Units | Test Method | Comparative | Example P |
|---|---|---|---|---|
| Transmittance | % | ASTM D1003 (2021) | 18.7 | 19 |
| Tensile Properties | | ASTM D882 (2018) | | |
| Elastic Modulus, MD | ksi | | 282 | 247 |
| Elongation to break, MD | % | | 54 | 44 |
| Yield Strain, MD | % | | 33.7 | 24 |
| Yield Stress, MD | ksi | | 8.9 | 17.7 |
| Tensile Strength, MD | ksi | | 25.8 | 18 |
| Elastic Modulus, CD | ksi | | 144 | 152 |
| Elongation to break, CD | % | | 38 | 45 |
| Yield Strain, CD | % | | 4.8 | 5.7 |
| Yield Stress, CD | ksi | | 2.1 | 2.5 |
| Tensile Strength, CD | ksi | | 2.2 | 2.4 |
| L&W Stiffness, MD | mN | Described in Test Methods above | 13.2 | 13.5 |
| L&W Stiffness, CD | mN | Described in Test Methods above | 28.7 | 28 |

Example Q—Lab Scale Run

Extruder ratios are % by volume; raw material levels are % by weight, based on the total weight of the specific layer

| Sample ID | Raw Materials | Extruder A - Skins Resin | Level | Extruder D - Ties Resin | Level | Extruder C - Core Resin | Level | Extruder B - Baby Core Resin | Level |
|---|---|---|---|---|---|---|---|---|---|
| Q-1 | Component 1 | PP | 49.75% | PP | 100% | $CaCO_3$ | 30.6% | PP | 61.4% |
| P version | Component 2 | antiblock | 0.5% | | | PP | 61.4% | $TiO_2$ | 8.0% |
| | Component 3 | EVA | 49.75% | | | TiO2 | 8.0% | $CaCO_3$ | 30.6% |
| | Extruder Ratios | | 15% | | 15% | | 50% | | 20% |
| Q-2 | Component 1 | PP | 49.75% | PP | 100% | $CaCO_3$ | 30.6% | Repel | 100.0% |
| 100% repel | Component 2 | antiblock | 0.5% | | | PP | 61.4% | | |
| baby core | Component 3 | EVA | 49.75% | | | $TiO_2$ | 8.0% | | |
| | Extruder Ratios | | 15% | | 15% | | 50% | | 20% |
| Q-3 | Component 1 | PP | 49.75% | PP | 100% | $CaCO_3$ | 30.6% | PP | 30.7% |
| 50% repel in | Component 2 | antiblock | 0.5% | | | PP | 61.4% | $TiO_2$ | 4.0% |
| baby core | Component 3 | EVA | 49.75% | | | $TiO_2$ | 8.0% | $CaCO_3$ | 15.3% |
| | Component 4 | | | | | | | Repel | 50% |
| | Extruder Ratios | | 15% | | 15% | | 50% | | 20% |
| Q-4 | Component 1 | PP | 49.75% | PP | 100% | CACO3 | 30.6% | PP | 12.3% |
| 80% repel in | Component 2 | antiblock | 0.5% | | | PP | 61.4% | $TiO_2$ | 1.6% |
| baby core | Component 3 | EVA | 49.75% | | | TiO2 | 8.0% | $CaCO_3$ | 6.1% |
| | Component 4 | | | | | | | Repel | 80% |
| | Extruder Ratios | | 15% | | 15% | | 50% | | 20% |
| Q-5 | Component 1 | PP | 49.75% | Repel | 100% | $CaCO_3$ | 30.6% | PP | 61.4% |
| 100% repel | Component 2 | antiblock | 0.5% | | | PP | 61.4% | TiO2 | 8.0% |
| in tie | Component 3 | EVA | 49.75% | | | $TiO_2$ | 8.0% | $CaCO_3$ | 30.6% |
| | Extruder Ratios | | 15% | | 15% | | 50% | | 20% |
| Q-6 | Component 1 | PP | 49.75% | PP | 50% | $CaCO_3$ | 30.6% | PP | 61.4% |
| 50% repel in | Component 2 | antiblock | 0.5% | Repel | 50% | PP | 61.4% | $TiO_2$ | 8.0% |
| tie | Component 3 | EVA | 49.75% | | | $TiO_2$ | 8.0% | $CaCO_3$ | 30.6% |
| | Extruder Ratios | | 15% | | 15% | | 50% | | 20% |
| Q-7 | Component 1 | PP | 49.75% | PP | 50% | $CaCO_3$ | 30.6% | PP | 30.7% |
| 50% repel in | Component 2 | antiblock | 0.5% | Repel | 50% | PP | 61.4% | $TiO_2$ | 4.0% |
| tie + | Component 3 | EVA | 49.75% | | | $TiO_2$ | 8.0% | $CaCO_3$ | 15.3% |
| 50% baby | Component 4 | | | | | | | Repel | 50% |
| core | Extruder Ratios | | 15% | | 15% | | 50% | | 20% |

*Repelletized ("Repel") Scrap Composition (% by weight)

| | |
|---|---|
| Polypropylene | 65.44% |
| EVA - 18% VA | 7.46% |
| 80% Calcium carbonate concentrate | 21.42% |

-continued

| | |
|---|---|
| $TiO_2$ concentrate | 5.6% |
| Process aid concentrate | 0.08% |

| Sample | Description | Caliper (mils) | Density (g/cc) | E MD (psi) | E CD (psi) | Tear MD (g) | Tear CD (g) | L&W MD (mN) | L&W CD (mN) | Gloss MD | Gloss CD | Opacity (%) |
|---|---|---|---|---|---|---|---|---|---|---|---|---|
| Q-1 | P version | 1.87 | 0.93 | 368400 | 171100 | 6.4 | 18.2 | 30.0 | 15.6 | 19 | 22 | 82.0 |
| Q-2 | 100% repel baby core | 2.06 | 0.94 | 363700 | 192400 | 8.6 | 54.2 | 35.2 | 20.3 | 14 | 17 | 68.0 |
| Q-3 | 50% repel in baby core | 1.81 | 0.93 | 320100 | 159600 | 7.0 | 30.4 | 25.5 | 13.8 | 13 | 17 | 84.0 |
| Q-4 | 80% repel in baby core | 1.69 | 0.94 | 352300 | 178700 | 6.4 | 52.4 | 19.9 | 9.4 | 14 | 16 | 75.0 |
| Q-5 | 100% repel in tie | 2.21 | 0.96 | 373300 | 193900 | 5.2 | 31.4 | 39.3 | 16.6 | 12 | 13 | 81.0 |
| Q-6 | 50% repel in tie | 1.92 | 0.94 | 375200 | 208100 | 5.2 | 50.8 | 28.7 | 17.2 | 12 | 13 | 74.0 |
| Q-7 | 50% repel in tie + 50% baby core | 1.8 | 0.95 | 347200 | 186700 | 4.6 | 14.0 | 23.2 | 12.0 | 11 | 12 | 81.0 |

When ranges are used herein for physical properties, such as molecular weight, or chemical properties, such as chemical formulae, all combinations, and sub combinations of ranges specific embodiments therein are intended to be included.

The disclosures of each patent, patent application, and publication cited or described in this document are hereby incorporated herein by reference, in their entirety.

Those skilled in the art will appreciate that numerous changes and modifications can be made to the preferred embodiments of the invention and that such changes and modifications can be made without departing from the spirit of the invention. It is, therefore, intended that the appended claims cover all such equivalent variations as fall within the true spirit and scope of the invention.

What is claimed is:

1. A multilayer film, comprising:
a core layer having a first side and second side;
a first skin layer on the first side of the core layer;
a second skin layer on the second side of the core layer;
a first tie coat between the core layer and the first skin layer; and
a second tie coat between the core layer and the second skin layer;
wherein the multilayer film is oriented only in a machine direction; and
wherein the multilayer film is cavitated;
wherein the first tie layer and the second tie layer each comprise:
about 60% by weight to about 99.8% by weight, based on the total weight of the tie layer, polypropylene;
about 0.1% by weight to about 10% by weight, based on the total weight of the tie layer, ethylene vinyl acetate; and
about 0.1% by weight to about 20% by weight, based on the total weight of the tie layer, filler.

2. A multilayer film of claim 1,
wherein the first tie layer and the second tie layer each comprise non-post-consumer waste recycled content.

3. A multilayer film of claim 1,
wherein the first tie layer and the second tie layer each comprise up to about 50% by weight, based on the total weight of the tie layer, non-post-consumer waste recycled content.

4. The multilayer film of claim 1, further comprising:
printed indicia on at least a portion of the first skin.

5. A product, comprising:
the multilayer film of claim 1;
an adhesive layer on at least a portion of the second skin layer on a side opposite to the core layer; and
an optional release liner on the adhesive layer.

* * * * *